US012600682B2

(12) United States Patent
Chadha et al.

(10) Patent No.: US 12,600,682 B2
(45) Date of Patent: Apr. 14, 2026

(54) MONOLITHIC SUBSTRATE SUPPORT HAVING POROUS FEATURES AND METHODS OF FORMING THE SAME

(71) Applicant: Applied Materials, Inc., Santa Clara, CA (US)

(72) Inventors: Arvinder Manmohan Singh Chadha, San Jose, CA (US); Christopher Beaudry, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 172 days.

(21) Appl. No.: 17/985,393

(22) Filed: Nov. 11, 2022

(65) Prior Publication Data

US 2024/0158308 A1     May 16, 2024

(51) Int. Cl.
| | |
|---|---|
| *B29C 65/00* | (2006.01) |
| *C04B 37/00* | (2006.01) |
| *C04B 38/00* | (2006.01) |
| *C04B 41/00* | (2006.01) |
| *C04B 41/53* | (2006.01) |
| *C04B 41/91* | (2006.01) |
| *B29C 65/02* | (2006.01) |

(52) U.S. Cl.
CPC .......... *C04B 37/001* (2013.01); *C04B 37/005* (2013.01); *C04B 38/0054* (2013.01); *C04B 38/007* (2013.01); *C04B 41/0045* (2013.01); *C04B 41/5353* (2013.01); *C04B 41/91* (2013.01); *B29C 65/02* (2013.01); *C04B 2237/10* (2013.01); *C04B 2237/32* (2013.01); *C04B 2237/58* (2013.01); *C04B 2237/62* (2013.01)

(58) Field of Classification Search
CPC .................................................... B29C 65/02
See application file for complete search history.

(56) References Cited

U.S. PATENT DOCUMENTS

| | | | |
|---|---|---|---|
| 5,903,428 A | 5/1999 | Grimard et al. | |
| 6,606,234 B1 | 8/2003 | Divakar | |
| 6,639,783 B1 | 10/2003 | Shamouilian et al. | |
| 10,847,402 B2 | 11/2020 | Boyd, Jr. et al. | |
| 11,380,572 B2 | 7/2022 | Prouty et al. | |
| 11,410,869 B1 * | 8/2022 | Parkhe | H01L 21/67103 |
| 11,456,161 B2 | 9/2022 | Larosa et al. | |
| 2003/0118481 A1 * | 6/2003 | Briscoe | G01N 30/6095 |
| | | | 422/89 |
| 2003/0188830 A1 | 10/2003 | Narendrnath et al. | |

(Continued)

OTHER PUBLICATIONS

International Search Report and Written Opinion dated Jan. 18, 2024 for Application No. PCT/US2023/035003.

*Primary Examiner* — Philip C Tucker
*Assistant Examiner* — Nickolas R Harm
(74) *Attorney, Agent, or Firm* — Patterson + Sheridan, LLP

(57)     ABSTRACT

A method of forming a substrate support for use in a processing chamber includes forming a porous region in each of a plurality of ceramic green sheets, stacking the plurality of ceramic green sheets, each having the porous region formed therein, to form a ceramic laminate, and sintering the ceramic laminate to form a monolithic ceramic body having a porous plug formed therein. The porous plug includes the porous regions in the plurality of ceramic green sheets that are sintered.

11 Claims, 7 Drawing Sheets

(56)         References Cited

U.S. PATENT DOCUMENTS

| | | | |
|---|---|---|---|
| 2009/0321356 A1* | 12/2009 | Gerhardt | G01N 30/606 |
| | | | 210/253 |
| 2016/0230269 A1 | 8/2016 | Raj et al. | |
| 2016/0276198 A1 | 9/2016 | Anada et al. | |
| 2017/0311455 A1* | 10/2017 | Brunner | H05K 1/0306 |
| 2019/0267218 A1* | 8/2019 | Wang | H01J 37/32715 |
| 2019/0391063 A1* | 12/2019 | Kanno | G01N 27/60 |
| 2022/0216086 A1 | 7/2022 | Ishikawa et al. | |
| 2023/0072908 A1* | 3/2023 | Huang | C25B 11/031 |

* cited by examiner

200

210
PATTERNING PROCESS:
FORM A POROUS REGION IN EACH OF
MULTIPLE CERAMIC GREEN SHEETS

220
LAMINATING PROCESS:
STACK MULTIPLE CERAMIC GREEN SHEETS,
EACH HAVING THE POROUS REGION
FORMED THEREIN, TOGETHER TO FORM A
CERAMIC LAMINATE

230
SINTERING PROCESS IS PERFORMED TO
FORM A MONOLITHIC CERAMIC BODY
HAVING A POROUS PLUG FORMED THEREIN

400

410

LASER CRACKING PROCESS:
FORM LASER-INDUCED MICRO-CRACKS
EXTENDING THROUGH A SINTERED
CERAMIC BODY

420

WET ETCHING PROCESS:
REMOVE PORTIONS HAVING THE
MICRO-CRACKS IN THE SINTERED CERAMIC
BODY

MONOLITHIC SUBSTRATE SUPPORT HAVING POROUS FEATURES AND METHODS OF FORMING THE SAME

BACKGROUND

Field

The embodiments of the disclosure generally relate to a substrate support having porous features embedded therein for use in a substrate processing chamber.

Description of the Related Art

Electrostatic chucks are utilized in a variety of manufacturing and processing operations. In semiconductor manufacturing, electrostatic chucks are commonly used to support a substrate in a processing chamber. Semiconductor manufacturing exposes the substrate support, which contains the electrostatic chuck, to the processing chamber environment and a range of temperatures between ambient and substrate process temperatures. In order to maintain the temperature of the substrate at a desired setpoint, the electrostatic chuck, which is generally formed from a ceramic, is coupled to a temperature control base. A bonding material is disposed between the electrostatic chuck and the temperature control base to form a connection therebetween. The substrate support, including the bonding material exposed at the interface between the electrostatic chuck and the temperature control base at any backside gas passages extending therethrough, is exposed to process gases and process reaction byproducts of the manufacturing process performed within the processing chamber. Some of these gases and byproducts, when coming into contact with the bonding material, can deteriorate and erode the bonding material. Conventionally, a porous plug is disposed in the back gas passage to prevent the passing of these gases and byproducts. However, porous plugs are typically inserted within the back side gas passages with glue. Erosion of the glue over the lifetime of the electrostatic chucks and heaters embedded therein facilitates premature arching failures and additional particle contaminations on a substrate supported on the electrostatic chucks.

Therefore, there is a need for an improved substrate support.

SUMMARY OF THE DISCLOSURE

Embodiments of the present disclosure provide a method of forming a substrate support for use in a processing chamber. The method includes forming a porous region in each of a plurality of ceramic green sheets, stacking the plurality of ceramic green sheets, each having the porous region formed therein, to form a ceramic laminate, and sintering the ceramic laminate to form a monolithic ceramic body having a porous plug formed therein. The porous plug includes the porous regions in the plurality of ceramic green sheets that are sintered.

Embodiments of the present disclosure also provide a method of forming a substrate support for use in a processing chamber. The method includes forming radiation-induced micro-cracks in a dielectric body, and removing portions of the dielectric body having the radiation-induced micro-cracks by wet etching. The dielectric body includes a sintered ceramic body, and the removed portions extend through a thickness of the dielectric body.

Embodiments of the present disclosure further provide a method of forming a substrate support for use in a processing chamber. The method includes patterning a first surface of a first dielectric body and a second surface of a second dielectric body, and bonding the first dielectric body and the second dielectric body.

BRIEF DESCRIPTION OF DRAWINGS

So that the manner in which the above recited features of the present disclosure are attained and can be understood in detail, a more particular description of the disclosure, briefly summarized above, may be had by reference to the embodiments thereof which are illustrated in the appended drawings. It is to be noted, however, that the appended drawings illustrate only embodiments of this disclosure and are therefore not to be considered limiting of its scope, for the disclosure may admit to other equally effective embodiments.

To facilitate understanding, identical reference numerals have been used, wherever possible, to designate identical elements that are common to the figures.

DETAILED DESCRIPTION

The embodiments described herein provide a monolithic dielectric body of a substrate support having porous features, such as porous plugs and gas channels, embedded therein, and methods of forming the same. The porous features are formed in-situ as a part of the dielectric body. Thus, there is no need to insert porous features, such as a porous plug, into a dielectric body and secured with an adhesive, preventing premature arching failure and particle contamination on a substrate during substrate processing.

Figure 1:
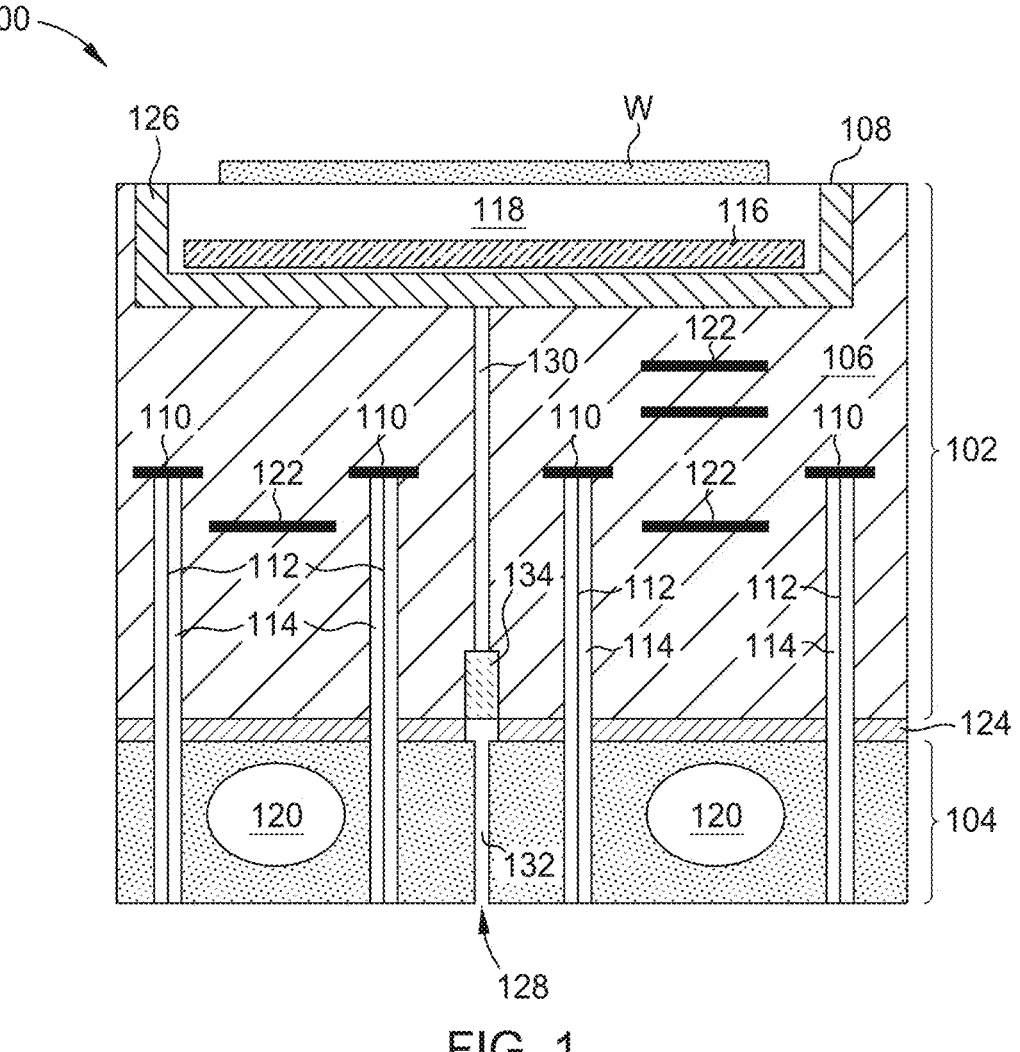
FIG. 1 depicts a schematic of a process chamber having a substrate support, according to one or more embodiments.

FIG. 1 is a schematic cross-sectional view of an exemplary substrate support 100 for use in a processing chamber. The substrate support 100 includes an electrostatic chuck 102 and a temperature control base 104. The electrostatic chuck 102 includes a dielectric body 106 formed of ceramic material, such as alumina, aluminum nitride, sapphire, or zirconia. The temperature control base 104 is formed of a metal such as aluminum. The temperature control base 104 is fixed to a cylindrical support post (not shown) which extends through a wall of a processing chamber to support the substrate support 100 thereon. The substrate support 100 may generally have a circular shape but other shapes, such as rectangular or ovoid, capable of supporting a substrate W may be utilized.

The dielectric body 106 includes an upper surface 108 for supporting a substrate W thereon. Electrodes 110 are embedded within the dielectric body 106. The electrodes 110 are each connected to a power source (not shown) thorough a feed through 112 disposed in an opening 114 formed through the substrate support 100. The power source imposes a voltage on the electrodes 110 to form an electromagnetic field at the interface of the upper surface 108 of the dielectric body 106 and the substrate W. The electromagnetic field interacts with the substrate W to chuck the substrate W to the upper surface 108 of the dielectric body 106. The electrodes 110 may be biased to provide either a monopolar or a bipolar chuck. A chucking electrode 116 may also be embedded within the dielectric body 106. A portion 118 of the dielectric body 106 between the upper surface 108 and the chucking electrode 116 covers the chucking electrode 116, and thus may be referred to as an "electrode cover."

The temperature control base 104 includes channels 120 disposed therein to circulate a fluid through the temperature control base 104. The fluid, typically a liquid such as GALDEN®, flows from a temperature control unit (not shown) through the channels 120 and back to the temperature control unit. In certain processes, the fluid is used to cool the temperature control base 104 in order to lower the temperature of the dielectric body 106 and the substrate W disposed thereon. Conversely, the fluid may be used to elevate temperature of the temperature control base 104 to heat the dielectric body 106 and the substrate W thereon. In other embodiments, resistive heaters 122 may be disposed within the dielectric body 106. In some cases, heat from the resistive heaters 122, in combination with heat transfer from the temperature control base 104 into the fluid, is used to maintain the dielectric body 106 or the substrate W at a setpoint temperature.

A bonding layer 124 is disposed between a lower surface of the dielectric body 106 and an upper surface of the temperature control base which faces the dielectric body 106. The upper surface of the temperature control base 104 is opposite the lower surface of the temperature control base 104 which is coupled to the cylindrical support post. The bonding layer 124 secures, and thermally couples, the dielectric body 106 to the temperature control base 104.

The electrostatic chuck 102 further includes a gas channel 126 embedded in the dielectric body 106 and disposed on the opposite side of the chucking electrode 116 from the upper surface 108 of the dielectric body 106. A backside gas (e.g., helium, nitrogen, or argon) is supplied by a gas source (not shown) through a flow aperture 128 and the gas channel 126 to aid in the control the temperature across the substrate W when it is retained by the electrostatic chuck 102. The gas channel 126 may have a diameter of between about 1 µm and about 1 mm.

The flow aperture 128 is disposed within the substrate support 100. As shown in FIG. 1, the flow aperture 128 extends from a lower surface of the temperature control base 104 to the gas channel 126. The flow aperture 128 includes a first opening 130 formed through the dielectric body 106 and the bonding layer 124, and a second opening 132 is formed through the temperature control base 104. The second opening 132 is aligned with the first opening 130 such that the second opening 132 and the first opening 130 have at least 10% overlap. The gas is maintained at a pressure sufficient to cause the gas to function as a heat conduction path between the substrate W and the dielectric body 106. The first opening 130 and the second opening 132 of the flow aperture may have a height of between about 1 µm and about 1 mm and a width of between about 100 µm and about 20 mm.

During processing, some gases are known to degrade the bonding layer 124 that is exposed to the gas at the flow apertures 128 and/or exposed portions at the periphery of the substrate support 100. In order to isolate the bonding layer 124 from the process gases, a seal (not shown) is disposed around the periphery thereof. The seal is, for example, an O-ring formed from a material resistant to degradation from exposure to the process gases. In this example, the O-ring contacts, and is compressed between, the temperature control base 104 and the dielectric body 106 which prevents flow of a process gas thereby isolating the bonding layer 124.

A porous plug 134 is optionally disposed within the dielectric body 106 in the first opening 130 of the flow aperture 128. The porous plug 134 is formed from a porous material such as a ceramic which may be alumina or zirconia. The plug 134 has a porosity, such as a range of porosity between about 10% and about 80%, for example about 40% to about 60% which allows the passage of the gas from an area of the first opening 130 proximate to the second opening 132, through the porous plug 134, and fluidly communicate with the gas channel 126. The porous plug 134 further prevents ionized particles or ionized gas from passing from a processing area in the processing chamber, and into the isolated portion of the volume defined by openings 130, 132 when the substrate W is not disposed on the dielectric body 106. The porous plug 134 may have a diameter of between about 0.1 mm and about 10 mm, for example, about 1 mm.

Figure 2:
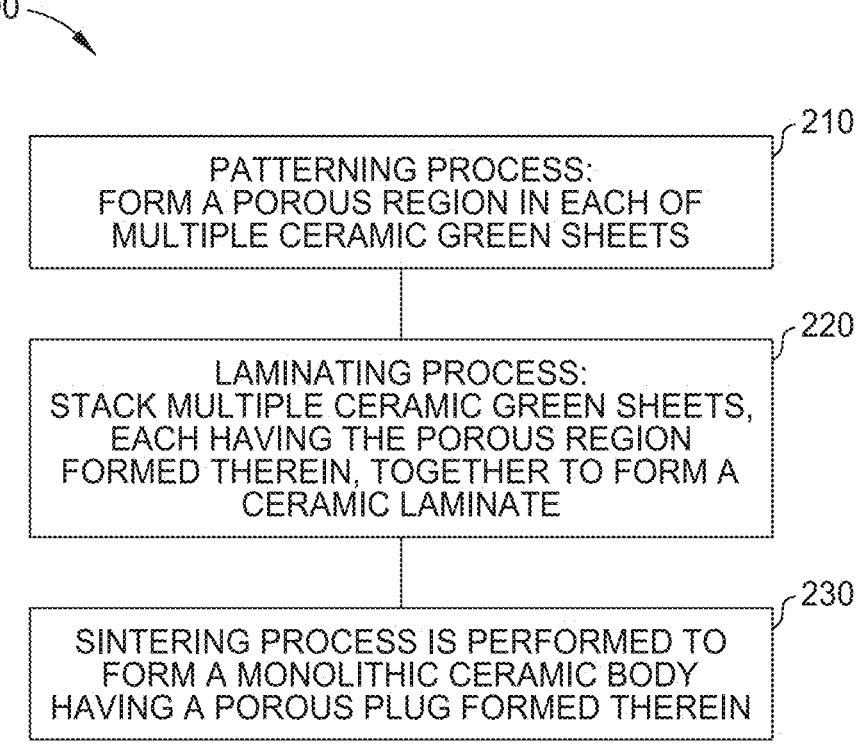
FIG. 2 depicts a process flow diagram of a method of forming a portion of a dielectric body having a porous plug formed therein, according to one or more embodiments.
Figure 3A:
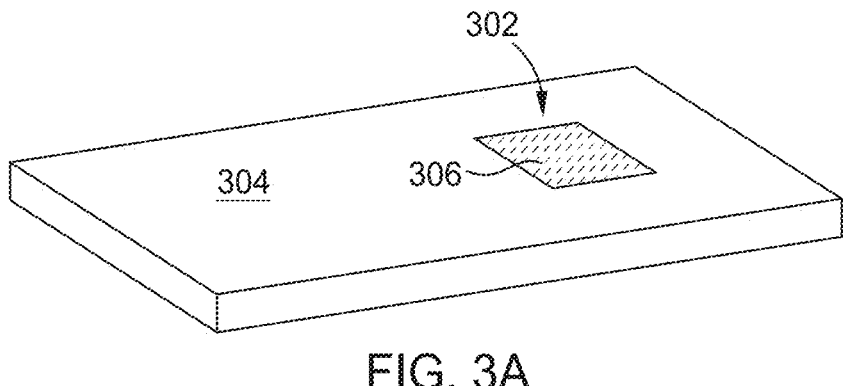
FIG. 3A is an isometric view.
Figure 3B:
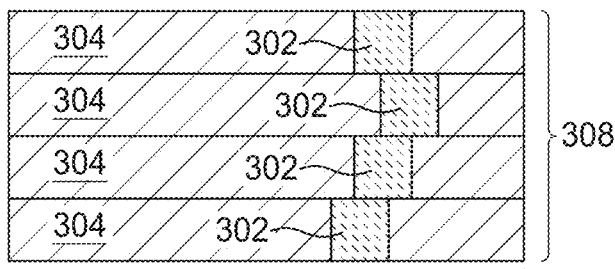
FIGS. 3B and 3C are cross-sectional views of a portion of a dielectric body, according to one or more embodiments.
Figure 3C:
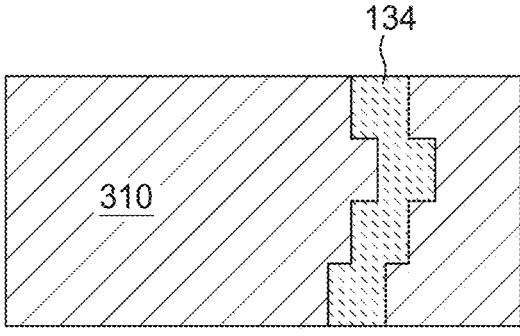

FIG. 2 depicts a process flow diagram of a method 200 of forming a portion of the dielectric body 106 having a porous plug 134 formed therein, according to some embodiments. FIG. 3A is an isometric view, and FIGS. 3B and 3C are cross-sectional views of a portion of the dielectric body 106 corresponding to various states of the method 200. It should be understood that FIGS. 3A, 3B, and 3C illustrate only partial schematic views of the dielectric body 106, and the dielectric body 106 may contain any number of additional materials, such as electrodes 110, 116, resistive heaters 122, openings 114, a gas channel 126, an opening 130, (shown in FIG. 1), embedded therein. It should also be noted that although the method illustrated in FIG. 2 is described sequentially, other process sequences that include one or more operations that have been omitted and/or added, and/or has been rearranged in another desirable order, fall within the scope of the embodiments of the disclosure provided herein.

The method 200 begins with block 210, in which a patterning process is performed to form a porous region 302 in each of multiple ceramic green sheets 304, as shown in FIG. 3A. The patterning process in block 210 may include forming holes 306 in the porous region 302 through each ceramic green sheet 304, by micro-machining, such as drilling, laser ablation, or mask assisted bead blasting. Laser wavelength used in the laser ablation may be extreme ultraviolet (EUV) wavelength, such as 248 nm, ultraviolet (UV) wavelength, such as 355 nm, near infrared (IR) wavelength, such as 1.5 µm, or IR wavelength, such as 10.2 µm. Each ceramic green sheet 304 may be formed of ceramic material and resin material, with a thickness of between about 5 µm and about 1 mm, for example, about 200 µm. Examples of ceramic material include alumina, aluminum nitride, sapphire, and zirconia. Examples of resin material include solvents such as methyl ethyl ketone (MEK), acetone, ethanol/isopropanol, MEK/ethanol, MEK/toluene, MEK/acetone, toluene, ethanol/Toluene, ethanol/isopropanol/Toluene, and MEK/ethanol/cyclohexanone; dispersants such as fish oil, castor oil, tributyl phosphate, triethanolamine, corn oil, and phosphate ester, binders such as polyvinyl alcohol, polyvinyl butyral, polyacrylate esters, acrylic resin, methyl cellulose, ethyl cellulose, polymethyl methacrylate, and polypropylene carbonate, and plasticizers such as butyl benzyl phthalate, dibutyl phthalate, dimethyl phthalate, dioctyl phthalate, polyethylene glycol, and butyl stearate. The porous region 302 in each ceramic green sheet 304 may have a width of between about 0.1 mm and about 10 mm, having holes 306 with a diameter of between about 0.1 μm and about 100 μm, and spacing between adjacent holes of between about 1 μm and about 50 μm. Sizes of the holes 306 and/or spacing between adjacent holes 306 may not be uniform within the porous region 302. The holes 306 may be formed in a random pattern or in a one dimensional (1D) or two dimensional (2D) pattern within the porous region 302. The holes 306 may be cylindrical or of other shapes. The holes 306 may extend perpendicular to each ceramic green sheet 304, or at any angle to the ceramic green sheet 304. The hole topography (e.g., sizes and/or distributions of holes 306) within each ceramic green sheet 304 and across multiple ceramic green sheets 304 may be adjusted depending on desired porosity of the porous plug 134 and desired gas flow rate through the porous plug 134.

In block 220, a laminating process is performed to stack multiple ceramic green sheets 304, each having the porous region 302 formed therein, together to form a ceramic laminate 308, as shown in FIG. 3B. In FIG. 3B, four ceramic green sheets 304 are shown in the ceramic laminate 308. However, the number of ceramic green sheets 304 to be stacked together can be less or more than four. In stacking the ceramic green sheets 304, the porous regions 302 of two adjacent ceramic green sheets 304 may be misaligned, while the porous regions 302 of the adjacent ceramic green sheets 304 have an overlap at the interface between the adjacent ceramic green sheets 304.

In block 230, a sintering process is performed to form a monolithic ceramic body 310 having a porous plug 134 formed therein. The porous regions 302 of the multiple ceramic green sheets 304 that are now sintered collectively form the porous plug 134. The sintering process may include co-firing the ceramic laminate 308, with a belt furnace or a batch furnace, at a firing temperature of between about 600° C. and about 1800° C. The monolithic ceramic body 310 can be used as a plasma resistant portion of the dielectric body 106 (shown in FIG. 1).

Figure 4:
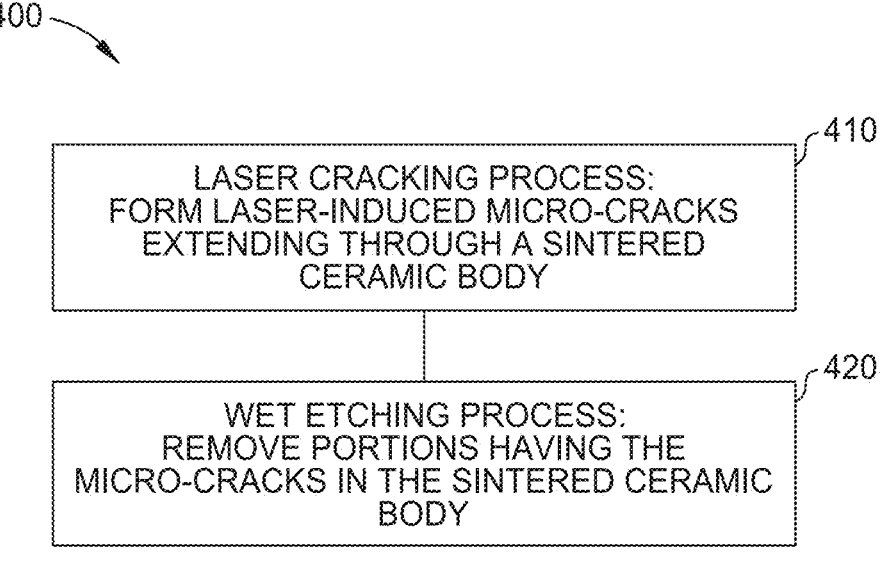
FIG. 4 depicts a process flow diagram of a method of forming a portion of a dielectric body having a porous plug, a gas channel, and a flow aperture formed therein, according to one or more embodiments.

FIG. 4 depicts a process flow diagram of a method 400 of forming a portion of the dielectric body 106 having a porous plug 134, a gas channel 126, and a flow aperture 128 formed therein, according to some embodiments. FIGS. 5A, 5B, 5C, 5D, 5E, 5F, 5G, 5H, 5I, and 5J are cross-sectional views of a portion of the dielectric body 106 corresponding to various states of the method 400. It should be understood that FIGS. 5A, 5B, 5C, 5D, 5E, 5F, 5G, 5H, 5I, and 5J illustrate only partial schematic views of the dielectric body 106, and the dielectric body 106 may contain any number of additional materials, such as electrodes 110, 116, resistive heaters 122, and openings 114 (shown in FIG. 1), embedded therein. It should also be noted that although the method illustrated in FIG. 4 is described sequentially, other process sequences that include one or more operations that have been omitted and/or added, and/or has been rearranged in another desirable order, fall within the scope of the embodiments of the disclosure provided herein.

The method 400 begins with block 410, in which a radiation cracking process is performed to form radiation-induced micro-cracks 502A, 502B, 502C, and 502D extending through a sintered ceramic body 504, as shown FIGS. 5A, 5B, 5C, and 5D, respectively. The sintered ceramic body 504 may be formed of ceramic material, such as alumina, aluminum nitride, sapphire, or zirconia, by any appropriate ceramic forming methods, such as hot isostatic pressing (HIP) and tape casting. The sintered ceramic body 504 may have a thickness of between about 0.5 mm and about 15 mm. The radiation cracking process may include focusing an intense radiation into the sintered ceramic body 504. The radiation source may be laser having extreme ultraviolet (EUV) wavelength, such as 248 nm, ultraviolet (UV) wavelength, such as 355 nm, near infrared (IR) wavelength, such as 1.5 μm, or IR wavelength, such as 10.2 μm. The radiation source may be a diode array, or an infrared lamp combined with focusing optics. The micro-cracks 502A in a random pattern, the micro-cracks 502B in a 2D periodic pattern, and/or the micro-cracks 502C in a tortuous path with multiple pitches, such as a spiral or a zigzag, extend through a thickness of the sintered ceramic body 504 within a region having a width of between about 0.1 mm and about 10 mm. The micro-cracks 502C in a tortuous path may be used to increase effective length of the micro-cracks 502C as compared to the thickness of the sintered ceramic body 504. The micro-cracks 502D in a field goal shape also extend through the thickness of the sintered ceramic body 504. A depth of focus of the radiation can be altered either by changing optics in the radiation path, or keeping a beam spot location fixed and translating a stage holding the sintered ceramic body 504. The radiation can be used from either a top side or a bottom side of the sintered ceramic body 504 to form micro-cracks 502A, 502B, 502C, and 502D.

In block 420, a wet etching process is performed to remove portions having the micro-cracks 502A, 502B, 502C, and 502D in the sintered ceramic body 504, as shown in FIGS. 5E, 5F, 5G, and 5H. The wet etching process may use etchant including buffered oxide etchant, tetramethyl-ammonium hydroxide (TMAH), metal hydroxides such as KOH, acids and vapor of acids such as HF, HCl, $H_3PO_4$, $H_2SO_4$. Etchants can be heated to accelerate the etch rate. Due to etch selectivity of the portions having the micro-cracks 502A, 502B, 502C, and 502D to the remaining portion of the sintered ceramic body 504, only the portions having the micro-cracks 502A, 502B, 502C, and 502D are removed. The removed portions 506A, 506B, and 506C may be used as holes in a porous plug 134 embedded in the sintered ceramic body 504. The holes may have a diameter of between about 1 μm and about 1 mm, for example, between about 10 μm and about 100 μm, and spacing between adjacent holes of between about 1 μm and about 100 μm. The holes may be disposed within a porous region having a width of between about 0.1 mm and about 10 mm. Sizes of the holes and/or spacing between adjacent holes may not be uniform within the porous region. The removed portions 506D in a field goal shape, having two openings on a surface of the sintered ceramic body 504 and one opening on the opposite surface of the sintered ceramic body 504, may be used as a gas channel 126 and a flow aperture 128 embedded in the sintered ceramic body 504. The removed portions 506D may have a height of between about 1 μm and about 1 mm and a width of between about 100 μm and about 20 mm. The sintered ceramic body 504 having a porous plug 134 and/or a gas channel 126 with a flow aperture 128 formed therein can be used as a portion of the dielectric body 106 (shown in FIG. 1).

Figures 5A, 5B, 5C, 5D, 5E, 5F, 5G, 5H, 5I, 5J:
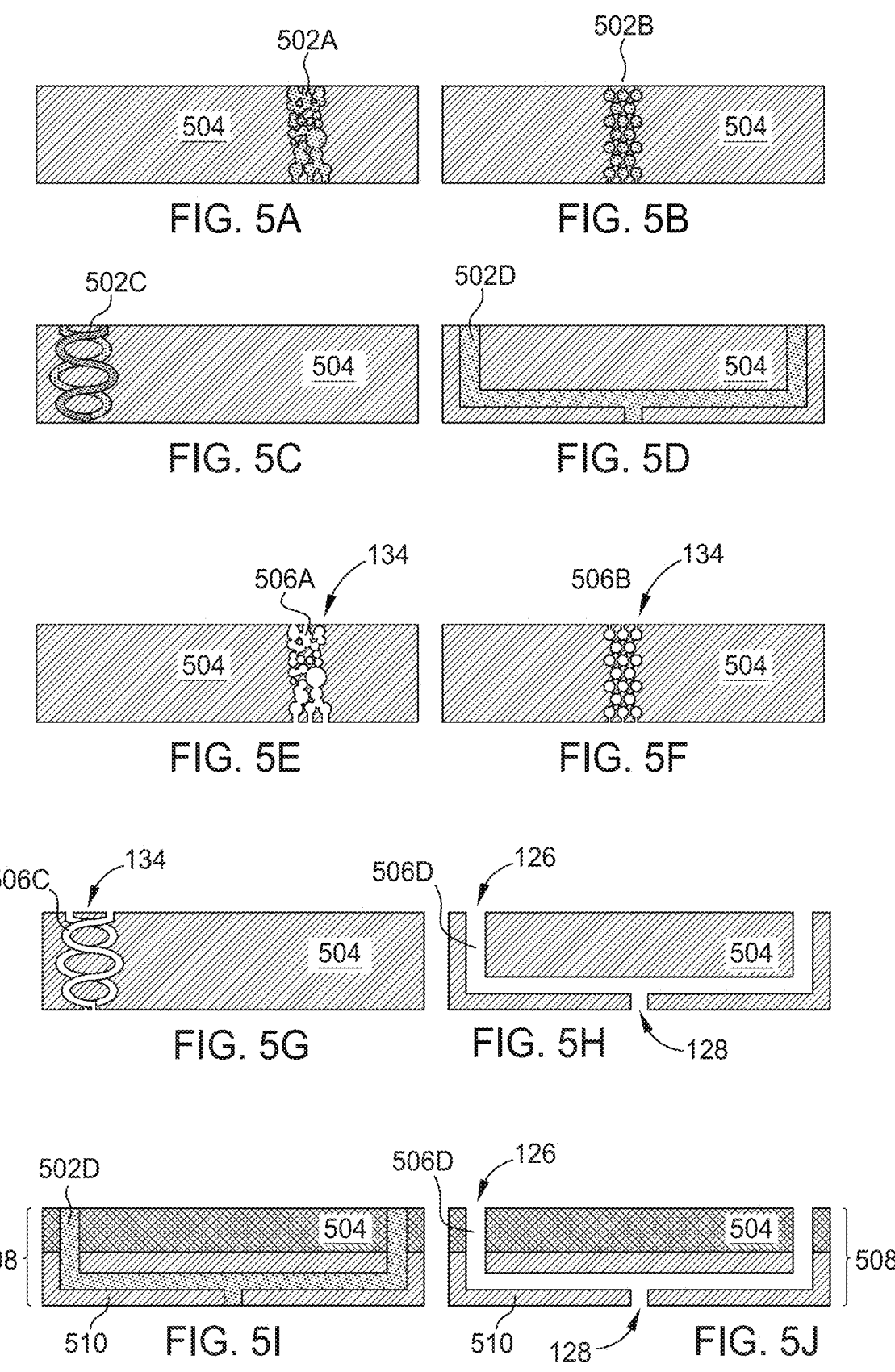
FIGS. 5A, 5B, 5C, 5D, 5E, 5F, 5G, 5H, 5I, and 5J are cross-sectional views of a portion of a dielectric body, according to one or more embodiments.

In some embodiments, a composite dielectric body 508 of more than one dielectric bodies, for example, a sintered ceramic body 504 and a dielectric coating 510 is used in the radiation cracking process in block 410, as shown in FIG. 51. The dielectric coating 510 may be deposited on the sintered ceramic body 504 using any appropriate deposition process, such as spray coating, physical vapor deposition (PVD), chemical vapor deposition (CVD), atomic layer deposition (ALD), laminating, or the like. The dielectric coating 510 may be formed of metal oxides, such as AlxOy, YxOy, metal fluoride including $MgF_2$, metal nitrides including SiN, AlN, or the like. The radiation cracking process may form micro-cracks only within the sintered ceramic body 504 or within both of the sintered ceramic body 504 and the dielectric coating 510. In FIG. 51, the micro-cracks 502D in the sintered ceramic body 504 and the dielectric coating 510. Micro fractures, such as the micro-cracks 502D, formed in the radiation cracking process in block 410 are removed by the wet etching process in block 420 to form holes and/or channels that can be used as holes in a porous plug 134 and/or a gas channel 126 with a flow aperture 128, as shown in FIG. 5J. The composite dielectric body 508 having a porous plug and/or a gas channel 126 with a flow aperture 128 formed therein can be used as a portion of the dielectric body 106 (shown in FIG. 1).

Figure 6:
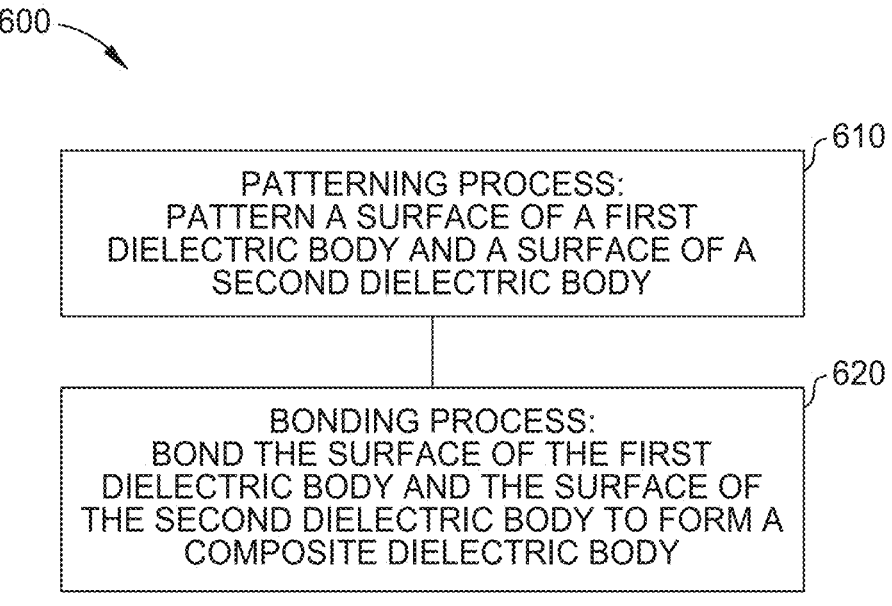
FIG. 6 depicts a process flow diagram of a method of forming a portion of a dielectric body having a porous plug, a gas channel, and a flow aperture formed therein, according to one or more embodiments.
Figure 7A:
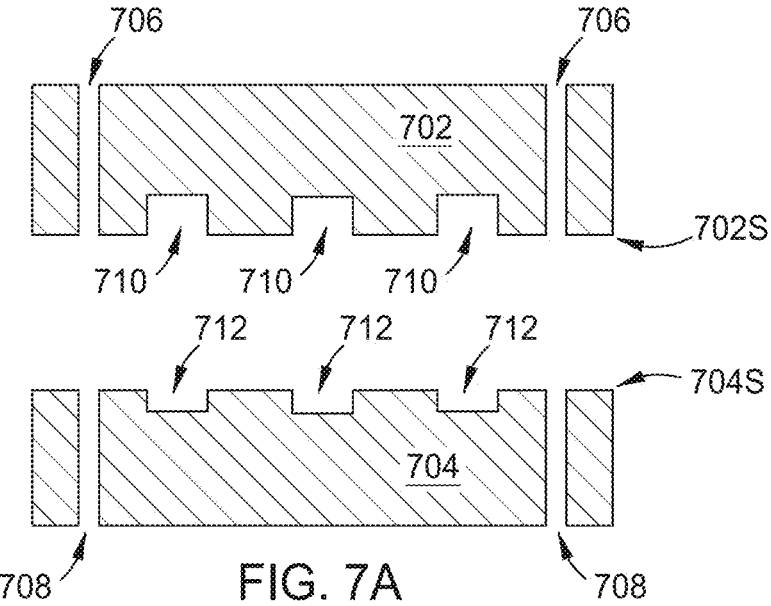
FIGS. 7A and 7B are cross-sectional views of a portion of a dielectric body, according to one or more embodiments.
Figure 7B:
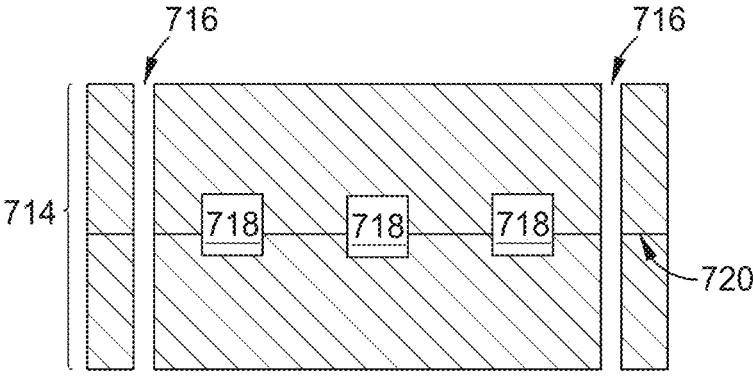

FIG. 6 depicts a process flow diagram of a method 600 of forming a portion of the dielectric body 106 having a porous plug 134, a gas channel 126, and a flow aperture 128 formed therein, according to some embodiments. FIGS. 7A and 7B are cross-sectional views of a portion of the dielectric body 106 corresponding to various states of the method 600. It should be understood that FIGS. 7A and 7B illustrate only partial schematic views of the dielectric body 106, and the dielectric body 106 may contain any number of additional materials, such as electrodes 110, 116, resistive heaters 122, openings 114, a gas channel 126, an opening 130, (shown in FIG. 1), embedded therein. It should also be noted that although the method illustrated in FIG. 6 is described sequentially, other process sequences that include one or more operations that have been omitted and/or added, and/or has been rearranged in another desirable order, fall within the scope of the embodiments of the disclosure provided herein.

The method 600 begins with block 610, in which a patterning process is performed to pattern a surface 702S of a first dielectric body 702 and a surface 704S of a second dielectric body 704, as shown in FIG. 7A. In some embodiments, the first dielectric body 702 and the second dielectric body 704 are sintered ceramic bodies formed of ceramic material, such as alumina, aluminum nitride, sapphire, or zirconia, by any appropriate ceramic forming methods, such as hot isostatic pressing (HIP), tape casting. In some other embodiments, the first dielectric body 702 and the second dielectric body 704 are ceramic green bodies formed of ceramic material, such as alumina, aluminum nitride, sapphire, or zirconia, and resin material such as butyral-based resin or acrylic resin. The patterning process in block 610 may include forming holes 706 through the first dielectric body 702, holes 708 through the second dielectric body 704, recesses 710 from the surface 702S of the first dielectric body 702, and recesses 712 from the surface 704S of the second dielectric body 704, by micro-machining, such as drilling or laser ablation. Laser wavelength used in the laser ablation may be extreme ultraviolet (EUV) wavelength, such as 248 nm, ultraviolet (UV) wavelength, such as 355 nm, near infrared (IR) wavelength, such as 1.5 μm, or IR wavelength, such as 10.2 μm.

In block 620, a bonding process is performed to bond the surface 702S of the first dielectric body 702 and the surface 704S of the second dielectric body 704 to form a composite dielectric body 714, as shown in FIG. 7B. The holes 706 may be aligned with the holes 708 to form through holes 716. The recesses 710 may be aligned with the recesses 712 to form holes 718 embedded in the composite dielectric body 714.

In the embodiments in which the first dielectric body 702 and the second dielectric body 704 are sintered ceramic bodies, the bonding process in block 620 may include a diffusion bonding process or a glass frit bonding process. In the bonding process, a metallic or dielectric interlayer 720 may be interposed between the surface 702S of the first dielectric body 702 and the surface 704S of the second dielectric body 704. In the embodiments in which the first dielectric body 702 and the second dielectric body 704 are ceramic green bodies, the bonding process in block 620 may include laminating and sintering the first dielectric body 702 and the second dielectric body 704. In the bonding process, a dielectric interlayer 720 may be interposed between the surface 702S of the first dielectric body 702 and the surface 704S of the second dielectric body 704.

The composite dielectric body 714 having holes 716 and 718 formed therein can be used a portion of the dielectric body 106, where the holes 716 and 718 are used as holes in a porous plug 134 and/or a gas channel 126 with a flow aperture 128 (shown in FIG. 1).

Monolithic dielectric bodies described herein have porous features, such as porous plugs and gas channels, embedded therein, and are suitable for use in substrate support together with a cooling base secured to the monolithic dielectric body with a bonding layer. The porous features are formed in-situ as a part of the dielectric body. Thus, there is no need to insert porous features, such as a porous plug, into a dielectric body with the help of glue, preventing premature arching failure and particle contamination on a substrate during a substrate processing.

While the foregoing is directed to embodiments described herein, other and further embodiments may be devised without departing from the basic scope thereof, and the scope thereof is determined by the claims that follow.

What is claimed is:

1. A method of forming a substrate support for use in a processing chamber, the method comprising:
   micro-machining holes through each of a plurality of ceramic green sheets in a first direction, wherein each hole in each of the plurality of ceramic green sheets extends in the first direction;
   forming a ceramic laminate by stacking the plurality of ceramic green sheets, wherein an un-filled hole in each of the plurality of ceramic green sheets is connected to an un-filled hole in an adjacent ceramic green sheet of the plurality of ceramic green sheets in the first direction; and
   forming a monolithic ceramic body by sintering the ceramic laminate.

2. The method of claim 1, wherein the holes each have a diameter of between 0.1 μm and 100 μm.

3. The method of claim 1, wherein the micro-machining comprises drilling, laser ablation, or mask assisted bead blasting.

4. The method of claim 1, wherein each of the plurality of ceramic green sheets has a thickness of between 5 μm and 1 mm.

5. The method of claim 1, wherein regions with the holes formed therein in adjacent ceramic green sheets in the ceramic laminate have an overlap.

6. The method of claim 1, wherein the sintering the ceramic laminate comprises co-firing the ceramic laminate at a firing temperature of between about 600° C. and about 1800° C.

7. A method of forming a substrate support for use in a processing chamber, the method comprising:

micro-machining first holes through a first dielectric body in a first direction, first recesses in a first surface of the first dielectric body, second holes through a second dielectric body in the first direction, and second recesses in a second surface of the second dielectric body; and aligning each of the first recesses with a respective one of the second recesses, and each of the first holes with a respective one of the second holes, and bonding the first dielectric body and the second dielectric body.

8. The method of claim 7, wherein the first and second dielectric bodies are sintered ceramic bodies comprising ceramic material selected from alumina, aluminum nitride, sapphire, and zirconia.

9. The method of claim 8, wherein the bonding of the first dielectric body and the second dielectric body comprises a diffusion bonding process or a glass frit bonding process.

10. The method of claim 7, wherein the first and second dielectric bodies are ceramic green bodies comprising ceramic material selected from alumina, aluminum nitride, sapphire, zirconia, and resin material.

11. The method of claim 10, wherein the bonding of the first dielectric body and the second dielectric body comprises laminating and sintering the first dielectric body and the second dielectric body.

* * * * *